(12) United States Patent
Ono (10) Patent No.: US 8,867,714 B2
(45) Date of Patent: Oct. 21, 2014

(54) COMMUNICATION APPARATUS

(75) Inventor: Hiroshi Ono, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 893 days.

(21) Appl. No.: 12/727,801

(22) Filed: Mar. 19, 2010

(65) Prior Publication Data

US 2010/0328712 A1    Dec. 30, 2010

(30) Foreign Application Priority Data

Jun. 30, 2009   (JP) .................................. 2009-155620

(51) Int. Cl.
*H04M 11/00*      (2006.01)
*H04N 1/327*      (2006.01)
*H04N 1/00*       (2006.01)
*H04L 12/40*      (2006.01)

(52) U.S. Cl.
CPC ....... *H04N 1/00214* (2013.01); *H04N 1/32765* (2013.01); *H04N 2201/002* (2013.01); *H04N 2201/0039* (2013.01); *H04N 1/0022* (2013.01); *H04L 12/40013* (2013.01); *H04N 1/32776* (2013.01); *H04N 1/32702* (2013.01); *H04N 1/32797* (2013.01)
USPC ...................... 379/100.01; 370/352; 358/1.15

(58) Field of Classification Search
CPC ............................. H04N 1/324; H04M 7/1205
USPC ......... 379/100.01, 220.01; 370/352; 709/238, 709/239; 358/1.15
See application file for complete search history.

(56) References Cited

U.S. PATENT DOCUMENTS

| | | | |
|---|---|---|---|
| 5,724,417 A * | 3/1998 | Bartholomew et al. .. | 379/211.05 |
| 6,496,573 B1 * | 12/2002 | Ichimura .................. | 379/100.06 |
| 8,243,720 B2 * | 8/2012 | Forte-McRobbie et al. .. | 370/352 |
| 2002/0072389 A1 * | 6/2002 | Ward et al. ............. | 455/552 |
| 2002/0116186 A1 * | 8/2002 | Strauss et al. ........ | 704/233 |
| 2004/0057421 A1 * | 3/2004 | Kawabata et al. ..... | 370/352 |

(Continued)

FOREIGN PATENT DOCUMENTS

| | | |
|---|---|---|
| CN | 1232341 A | 10/1999 |
| CN | 1409522 A | 4/2003 |

(Continued)

OTHER PUBLICATIONS

The State Intellectual Property Office of the People's Republic of China, Notification of First Office Action for Chinese Patent Application No. 201010144116.4 (counterpart Chinese patent application), issued Nov. 5, 2012.

*Primary Examiner* — Creighton Smith
(74) *Attorney, Agent, or Firm* — Baker Botts L.L.P.

(57) ABSTRACT

A communication apparatus including: a requiring section which transmits a requirement for establishing a state in which and the communication apparatus and a first communication apparatus are communicable with each other via an internet line, to the first communication apparatus via the internet line; a communication establishing section which establishes the state; a calling section which transmits a dial signal to an exchanger via the telephone line and calls a to-be-called apparatus, when the communication establishing section has established the state; a notifying section which transmits a notification about calling of the communication apparatus, to the first communication apparatus via the internet line after the calling section has called; a receiving section which receives an acknowledgment signal transmitted via the internet line from the first communication apparatus having received the notification; and a communication controlling section which controls the communication with the to-be-called apparatus via the telephone line.

15 Claims, 7 Drawing Sheets

(56) References Cited

U.S. PATENT DOCUMENTS

| | | |
|---|---|---|
| 2005/0099648 A1 | 5/2005 | Maeda |
| 2006/0146735 A1* | 7/2006 | Shaffer et al. ............... 370/260 |
| 2007/0127445 A1* | 6/2007 | Pearce et al. ............... 370/356 |
| 2007/0195825 A1* | 8/2007 | Wang ............................ 370/493 |
| 2008/0317008 A1* | 12/2008 | Forte-McRobbie et al. .. 370/352 |
| 2009/0238194 A1* | 9/2009 | Basart et al. ............... 370/401 |
| 2010/0138651 A1* | 6/2010 | Wang et al. ................. 713/155 |

FOREIGN PATENT DOCUMENTS

| | | |
|---|---|---|
| CN | 1893475 A | 1/2007 |
| JP | 2001-111759 A | 4/2001 |
| JP | 2003-348220 A | 12/2003 |
| JP | 2006-100966 A | 4/2006 |
| JP | 2008-098775 A | 4/2008 |

* cited by examiner

COMMUNICATION APPARATUS

CROSS REFERENCE TO RELATED APPLICATION

The present application claims priority from Japanese Patent Application No. 2009-155620, which was filed on Jun. 30, 2009, the disclosure of which is herein incorporated by reference in its entirety.

BACKGROUND OF THE INVENTION

1. Field of the Invention

The present invention relates to a communication apparatus.

2. Description of the Related Art

There is a technique that, before facsimile transmission, the number inputted by a user and a corporate telephone book database published on a network are verified, thereby checking whether the inputted number is correct or not.

SUMMARY OF THE INVENTION

However, in the above-described technique, where the number inputted by the user is not registered in the corporate telephone book database published on the network, the check of the inputted number cannot be performed unfortunately.

This invention has been developed in view of the above-described situations, and it is an object of the present invention to provide a communication apparatus which can reliably check whether a receiver apparatus is correct or not before data transmission, thereby preventing error transmission of data.

The object indicated above may be achieved according to the present invention which provides a communication apparatus capable of communicating with a first communication apparatus different from the communication apparatus via both of a public switched telephone network (PSTN) and an internet, the communication apparatus comprising: a requiring section configured to transmit, from the communication apparatus to the first communication apparatus, a requirement for establishing a state in which and the first communication apparatus is allowed to communicate with the communication apparatus via the internet, the requirement being transmitted from the communication apparatus to the first communication apparatus via the internet by using an IP address of the first communication apparatus; a first communication establishing section configured to establish a state in which the communication apparatus is allowed to communicate via the internet with the first communication apparatus that has accepted the request transmitted by the requiring section; a calling section configured to transmit a dial signal of an identification number on the PSTN which is associated with the IP address of the first communication apparatus, to a switch placed on the PSTN via the PSTN and to call an identification-number assigned apparatus which is to be called by the communication apparatus, when the first communication establishing section has established the state in which the communication apparatus is allowed to communicate with the first communication apparatus; a notifying section configured to transmit a notification about calling of the communication apparatus, from the communication apparatus to the first communication apparatus via the internet after the calling section has called; a first receiving section configured to receive an acknowledgment signal which is transmitted from the first communication apparatus having received the notification from the notifying section, to the communication apparatus via the internet, and which is based on whether the first communication apparatus has been called via the PSTN; and a communication controlling section configured to control the communication of the communication apparatus with the identification-number assigned apparatus via the PSTN, on the basis of the acknowledgment signal received by the first receiving section.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which.

DESCRIPTION OF THE EMBODIMENTS

Figure 1:
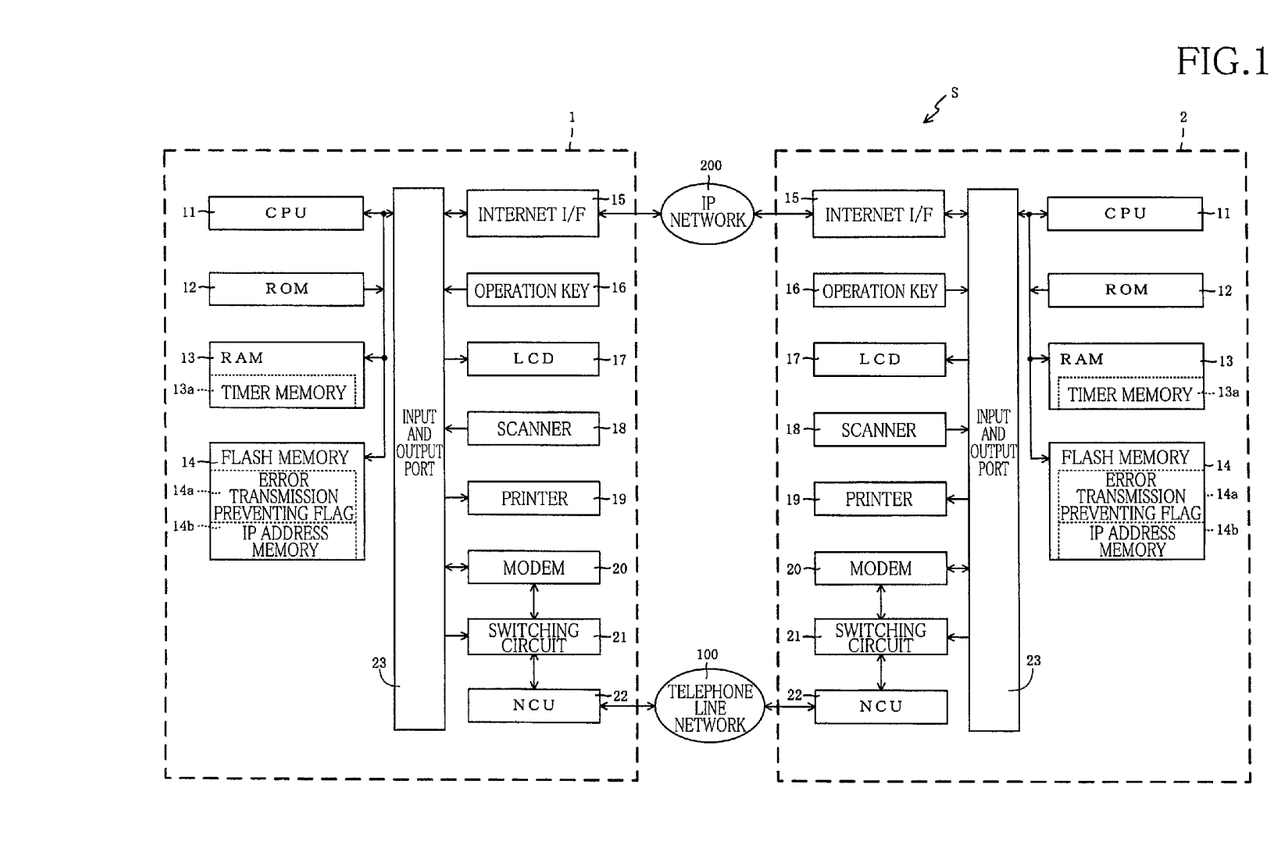
FIG. 1 is a block diagram showing an electric construction of a communication system.

Hereinafter, there will be described embodiments of the present invention by reference to the drawings. A communication system S in the present first embodiment is constituted by a first facsimile apparatus 1 and a second facsimile apparatus 2 which can communicate with each other via a public switched telephone network (PSTN) 100 and an IP network 200.

The first facsimile apparatus 1 and the second facsimile apparatus 2 are the same apparatus, that is, have the same construction, and are configured to be capable of transmitting and receiving facsimile data. In the following explanation, the first facsimile apparatus 1 and the second facsimile apparatus 2 will be respectively referred to as a sender apparatus 1 and a receiver apparatus 2 for easy understanding purpose. However, since the sender apparatus 1 and the receiver apparatus 2 are the same apparatus, an explanation is given only for the sender apparatus 1, and the same reference numerals as used in the sender apparatus 1 are used to designate the corresponding elements of the receiver apparatus 2, and an explanation of which is dispensed with.

The sender apparatus 1 is mainly constituted by a CPU 11, a ROM 12, a RAM 13, a flash memory 14, an internet interface 15, operation keys 16, an LCD 17, a scanner 18, a printer 19, a modem 20, a switching circuit 21, and an NCU 22, and these components are connected to each other via an input and output port 23.

The CPU 11 controls functions of the sender apparatus 1 and the components connected to the input and output port 23 in accordance with (a) fixed values and programs stored in the ROM 12, the RAM 13, and the flash memory 14 or (b) various signals transmitted and received via the internet interface 15 and the NCU 22.

Figure 3:
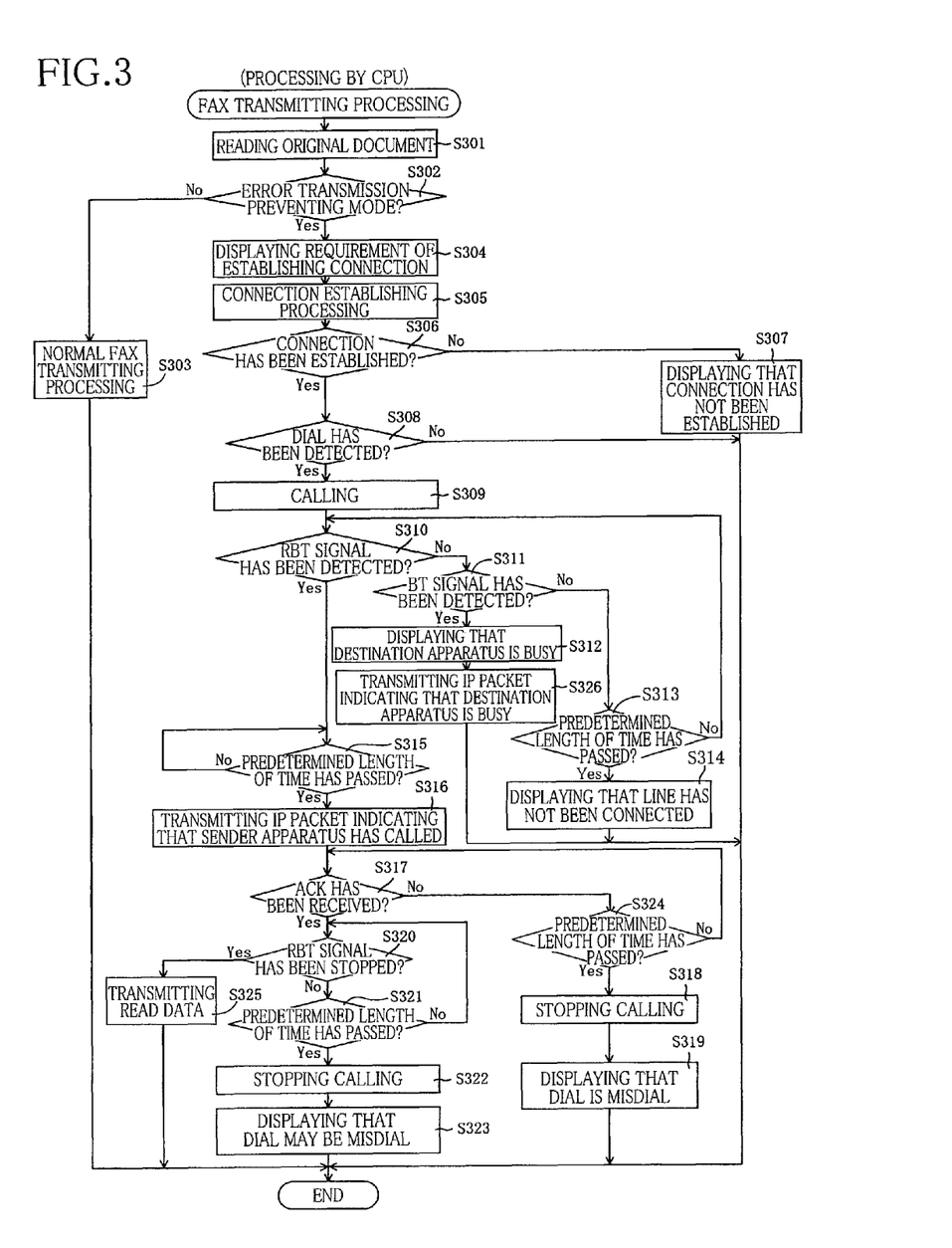
FIG. 3 is a flow-chart showing the FAX transmitting processing in the first embodiment.
Figure 4:
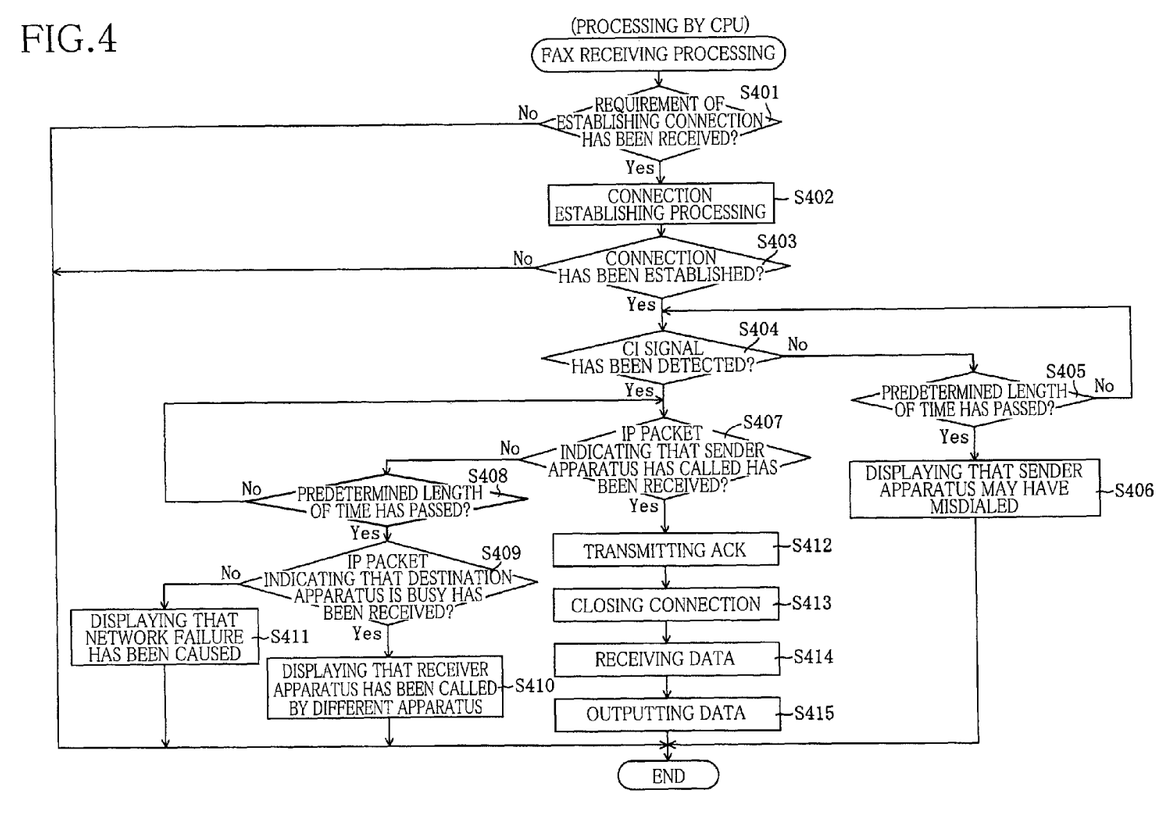
FIG. 4 is a flow-chart showing a FAX receiving processing in the first embodiment.

The ROM 12 is an unrewritable memory which stores control programs executed by the sender apparatus 1. A FAX (i.e., facsimile) transmitting processing and a FAX receiving processing which will be described below respectively shown in FIGS. 3 and 4 are stored in this ROM 12.

The RAM 13 is a rewritable and volatile memory for temporarily storing various data when the sender apparatus 1 performs various operations. The RAM 13 includes a timer memory 13*a*. The timer memory 13*a* stores count values of various timers.

The flash memory 14 is rewritable and nonvolatile memory. Data stored in this flash memory 14 is held also after a power of the sender apparatus 1 is turned off. This flash memory 14 stores an error transmission preventing flag 14*a* and an IP address memory 14*b* as a storage portion.

The error transmission preventing flag 14*a* is a flag which is set to "ON" where the first facsimile apparatus 1 is set in an error transmission preventing mode and which is set to "OFF" where the first facsimile apparatus 1 is not set in the error transmission preventing mode, that is, the error transmission preventing mode is canceled. The error transmission preventing mode is a mode in which an error transmission can be prevented when compared with a normal FAX mode. The IP address memory 14*b* stores (a) IP addresses of respective other apparatuses which can communicate with the sender apparatus 1 via the IP network 200 and (b) FAX numbers of the respective other apparatuses which can communicate with the sender apparatus 1 via the PSTN 100, with the IP addresses and the FAX numbers being respectively associated with or in correspondence with each other. The IP address memory 14*b* also stores respective registration names of said other apparatuses respectively in correspondence with the IP addresses and the FAX numbers.

The internet interface 15 is an interface for connecting to the IP network 200. The operation keys 16 include a start key, ten keys, various function keys, for example, and are used for inputting predetermined commands. The LCD 17 is a device for displaying various images. The scanner 18 is a device for reading an original document. The printer 19 is a device for recording an image on a recording sheet. The modem 20 is a device which modulates and demodulates data. The switching circuit 21 is a relay circuit which can switch the connection of the first facsimile apparatus 1 to the PSTN 100 between an ON state and an OFF state. The NCU 22 controls transmission of a dial signal to the PSTN 100, response to a ringing signal from the PSTN 100, and so on.

There will be explained the case where a FAX is transmitted from the sender apparatus 1 to the receiver apparatus 2 with reference to FIGS. 2A, 2B, and 2C.

Figure 2A:
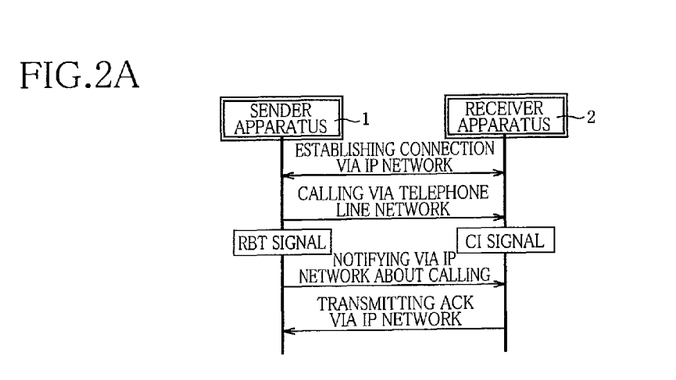
FIGS. 2A, 2B, and 2C are sequence views of a FAX transmitting processing in a first embodiment.

FIG. 2A is a sequence view showing the case where the FAX number of the receiver apparatus 2 is properly dialed. Where the FAX is transmitted in the error transmission preventing mode, the CPU 11 initially specifies the receiver apparatus 2 stored in the IP address memory 14*b*, and the first facsimile apparatus 1 establishes a connection with the receiver apparatus 2 so as to be allowed to transmit and receive IP packets via the IP network 200 using a peer-to-peer (hereinafter may be referred to as a "P2P").

When the first facsimile apparatus 1 has established the connection with the receiver apparatus 2, the FAX number of the receiver apparatus 2 is dialed to call the receiver apparatus 2 via the PSTN 100. Where the FAX number of the receiver apparatus 2 has been dialed properly, a ringing back tone (hereinafter may be referred to as a "RBT signal") indicating that a switch is calling an identification-number assigned apparatus is outputted from the switch to the sender apparatus 1, while a call indicator or a called signal (hereinafter may be referred to as a "CI signal") is outputted from the switch to the receiver apparatus 2.

When having detected the RBT signal, the sender apparatus 1 transmits, via the IP network 200, to the receiver apparatus 2 an IP packet indicating that the sender apparatus 1 has called the receiver apparatus 2. Where the receiver apparatus 2 has received this IP packet while detecting the CI signal, the receiver apparatus 2 transmits an acknowledgement signal (hereinafter may be referred to as an "ACK") to the sender apparatus 1. The ACK indicates that a called apparatus has received the notification that the calling apparatus has called the called apparatus. It is noted that the sender apparatus 1 transmits the facsimile data to the receiver apparatus 2 when the sender apparatus 1 has received the ACK and a line is closed or connected.

Figure 2B:
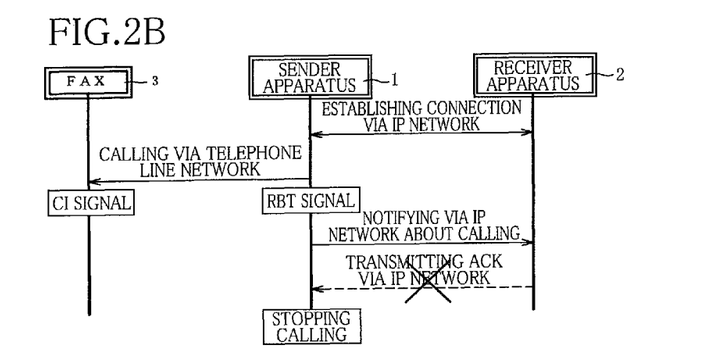

FIG. 2B is a sequence view showing the case where the sender apparatus 1 has not properly dialed the FAX number of the receiver apparatus 2 and dialed a FAX 3 which is a facsimile apparatus different from the receiver apparatus 2 because the FAX number is inputted by mistake when the FAX number is stored into the IP address memory 14*b*.

Also in this case, the sender apparatus 1 initially establishes the connection with the receiver apparatus 2 so as to be allowed to communicate with the receiver apparatus 2 via the IP network 200, but the sender apparatus 1 has not dialed the FAX number of the receiver apparatus 2 properly and dialed and called not the receiver apparatus 2 but the FAX 3.

In this case, the RBT signal is outputted to the sender apparatus 1 from the switch, and the CI signal is outputted to the FAX 3. However, the CI signal is not outputted to the receiver apparatus 2. Then, when the sender apparatus 1 has detected the RBT signal, the sender apparatus 1 transmits to the receiver apparatus 2 the IP packet indicating that the sender apparatus 1 has called the receiver apparatus 2 via the IP network 200, but the receiver apparatus 2 does not transmit the ACK because the CI signal cannot be detected, that is, the receiver apparatus 2 is not called. As a result, the sender apparatus 1 judges that the sender apparatus 1 has misdialed because the sender apparatus 1 has not received the ACK from the receiver apparatus 2 within a predetermined length of time, and the sender apparatus 1 forcefully stops the calling.

As thus described, the CPU 11 judges whether the sender apparatus 1 has misdialed or not by judging whether the receiver apparatus 2 has received, while being called, the notification that the sender apparatus 1 has called the receiver apparatus 2. Thus, the CPU 11 can judge whether the sender apparatus 1 has misdialed or not regardless of whether the FAX number of the receiver apparatus 2 is registered or not in the PSTN 100. Further, where the sender apparatus 1 cannot receive the ACK from the receiver apparatus 2, the sender apparatus 1 stops the calling, thereby preventing the facsimile data from being transmitted via the PSTN 100 to a facsimile apparatus different from the receiver apparatus 2.

Figure 2C:
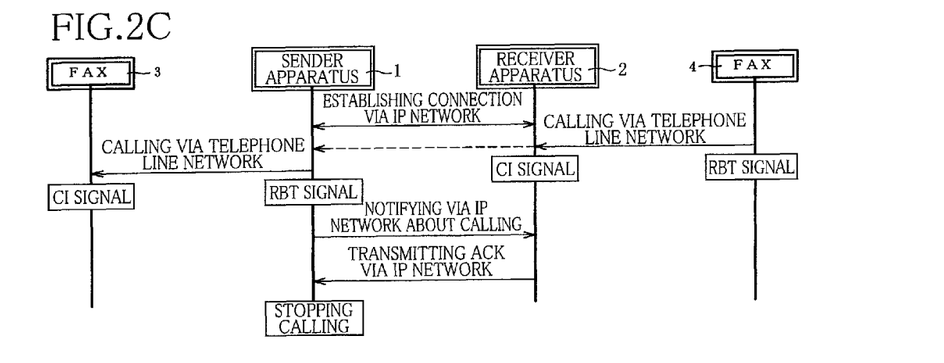

FIG. 2C is a sequence view showing the case where the sender apparatus 1 has not properly dialed the FAX number of the receiver apparatus 2 and dialed not the receiver apparatus but the FAX 3 as in the case of FIG. 2B. FIG. 2C especially shows the case where a FAX 4 has called the receiver apparatus 2 after the sender apparatus 1 has established the connection with the receiver apparatus 2 and before the sender apparatus 1 has called the FAX 3.

In this case, the CI signal is outputted from the switch to the receiver apparatus 2 on the basis that the FAX 4 has called the receiver apparatus 2, and then, like the above-described case, the sender apparatus 1 having misdialed transmits to the receiver apparatus 2 the IP packet indicating that the sender apparatus 1 has called the receiver apparatus 2 via the IP network 200.

In this case, the receiver apparatus 2 detects the CI signal by the calling of the FAX 4 and receives, during the detection, the IP packet indicating the calling. Thus, the receiver apparatus 2 transmits the ACK to the sender apparatus 1 via the IP network 200 in spite of occurring of misdial.

In order to prevent this problem, in the case where the sender apparatus 1 detects the RBT signal even after a predetermined length of time has passed from the receiving of the ACK, the sender apparatus 1 judges that misdial may occur although there is a possibility that the FAX 3 does not close or connect the line, and the sender apparatus 1 forcefully stops calling.

As thus described, there is the case in which the receiver apparatus 2 happens to be called by the FAX 4 which is different from the sender apparatus 1, at the timing when the sender apparatus 1 has misdialed. In this case, the receiver apparatus 2 may transmit the ACK to the sender apparatus 1 by judging that the receiver apparatus 2 has received the notification from the sender apparatus 1 while being called.

In order to prevent this, even in the case where the sender apparatus 1 has received the transmission from the receiver apparatus 2, where the sender apparatus 1 has detected that the telephone line is not closed or connected within the predetermined length of time, the sender apparatus 1 judges that there is a possibility of misdial and stops calling. Thus, the CPU 11 can more reliably judge whether the dial of the sender apparatus 1 is misdial or not, and can more reliably prevent the facsimile data from being transmitted via the PSTN 100 to a facsimile apparatus different from the receiver apparatus 2.

There will be explained a FAX transmitting processing with reference to FIG. 3. This FAX transmitting processing is a processing in which the sender apparatus 1 transmits a FAX and is performed in the case where a user has commanded to perform a FAX mode.

In this FAX transmitting processing, in S301, the scanner 18 initially reads the original document. It is noted that, before the processing of S301, one of calling destination apparatuses is selected by the user for sending a FAX. That is, the selected calling destination apparatus is an identification-number assigned apparatus which is to be called by the sender apparatus 1, and there is a case where the receiver apparatus 2 is not the identification-number assigned apparatus owing to the misdial of the user. Then, the FAX number and the IP address of the selected calling destination apparatus are read from the IP address memory 14b and specified. Then, in S302, the CPU 11 of the sender apparatus 1 judges whether the error transmission preventing mode is set or not, that is, the CPU 11 judges whether the error transmission preventing flag 14a is "ON" or not. Where the error transmission preventing flag 14a is "OFF" (S302: No), the CPU 11 performs in S303 a normal FAX transmitting processing, and the present FAX transmitting processing is finished.

Where the error transmission preventing flag 14a is "ON" (S302: Yes), the CPU 11 displays in S304 on the LCD 11a requirement of establishing a connection with the receiver apparatus 2. Then, in S305, the CPU 11 performs a connection establishing processing for establishing a connection with the receiver apparatus 2. Where the connection has not been established (S306: No), the CPU 11 displays in S307 on the LCD 17 that the connection has not been established, and the present FAX transmitting processing is finished.

Where the connection has been established (S306: Yes), the CPU 11 judges in S308 whether the CPU 11 has detected a dial signal representing a FAX number of the calling destination apparatus or not. Where the CPU 11 has not detected dial signal (S308: No), the present FAX transmitting processing is finished. Where the CPU 11 has detected dial signal (S308: Yes), the sender apparatus 1 calls in S309 the calling destination apparatus.

Then, the CPU 11 starts measurement of a timer and judges in S310 whether the CPU 11 has detected the RBT signal or not. Where the CPU 11 has not detected the RBT signal (S310: No), the CPU 11 judges in S311 whether the CPU 11 has detected a busy tone or signal (hereinafter may be referred to as a "BT signal") indicating that the switch is communicating with the calling destination apparatus or not. Where the CPU 11 has detected the BT signal (S311: Yes), the CPU 11 displays in S312 that the calling destination apparatus is in a busy state on the LCD 17. Then, in S326, the CPU 11 transmits an IP packet indicating that the calling destination apparatus is in the busy state, via the IP network 200 to the receiver apparatus 2 with which the sender apparatus 1 has established the connection, and the present FAX transmitting processing is finished. On the other hand, where the CPU 11 has not detected the BT signal (S311: No), the CPU 11 judges in S313 whether a predetermined length of time has passed or not. Where the predetermined length of time has passed (S313: Yes), the CPU 11 displays in S314 on the LCD 17 that the sender apparatus 1 cannot connect the line to the calling destination apparatus, and the present FAX transmitting processing is finished. Where the predetermined length of time has not passed (S313: No), the CPU 11 repeats the processings from S310.

Where the CPU 11 has detected the RBT signal (S310: Yes), the CPU 11 starts measurement of a timer for the RBT signal. Then, in S315, the CPU 11 judges whether a predetermined length of time (e.g., five seconds) has passed or not. Where the predetermined length of time has not passed, the CPU 11 waits until the predetermined length of time has passed. Where the predetermined length of time has passed (S315: Yes), the CPU 11 transmits, in S316, an IP packet indicating that the sender apparatus 1 has called the calling destination apparatus, via the IP network 200 to the receiver apparatus 2 with which the sender apparatus 1 has established the connection. It is noted that the IP packet transmitted in S316 may be an IP packet indicating that the sender apparatus 1 has called the receiver apparatus 2.

Then, where the CPU 11 has transmitted the IP packet indicating that the sender apparatus 1 has called the calling destination apparatus, the CPU 11 starts measurement of a timer for the ACK and judges whether the CPU 11 judges in S317 whether the CPU 11 has received the ACK from the receiver apparatus 2 or not. Where the CPU 11 has not received the ACK (S317: No), the CPU 11 judges in S324 whether a predetermined length of time has passed or not. Where the predetermined length of time has not passed (S324: No), the CPU 11 repeats the processing of S317. Where the CPU 11 has not received the ACK even after the predetermined length of time has passed (S324: Yes), the CPU 11 judges that the dial of the sender apparatus 1 is misdial and stops calling in S318. That is, the CPU 11 controls the switching circuit 21 to forcefully turn off or disconnect the connection with the PSTN 100, and displays in S319 on the LCD 17 that the dial of the sender apparatus 1 is misdial, and the present FAX transmitting processing is finished.

On the other hand, where the CPU 11 has received the ACK (S317: Yes), the CPU 11 starts measurement of a timer for the RBT signal and judges in S320 whether the RBT signal has been stopped or not. Where the RBT signal has not been stopped (S320: No), the CPU 11 judges in S321 whether a predetermined length of time (e.g., sixty seconds) has passed or not. Where the predetermined length of time has not passed (S321: No), the CPU 11 repeats the processings from S320. Where the RBT signal has been stopped (S320: Yes), the CPU 11 judges that the line is closed or connected and transmits in S325 read or scanned data to the calling destination apparatus, and the present FAX transmitting processing is finished.

Where the predetermined length of time has passed (S321: Yes), the CPU 11 stops the calling in S322. That is, the CPU 11 controls the switching circuit 21 to forcefully turn off or disconnect the connection with the PSTN 100, and displays in S323 on the LCD 17 that the dial of the sender apparatus 1 may be misdial, and the present FAX transmitting processing is finished.

That is, in the case where the RBT signal has not been stopped within the predetermined length of time in spite of receiving the ACK, there is a possibility that the calling destination apparatus merely does not connect the line rather than an affect of the misdial, but there is also a possibility of occurring of the case explained with reference to FIG. 2C. Thus, in order to reliably prevent the error transmission, the sender apparatus 1 stops the calling in S322.

There will be explained a FAX receiving processing with reference to FIG. 4. This FAX receiving processing is a processing in which the receiver apparatus 2 receives a FAX transmitted from the sender apparatus 1 and is performed on a regular basis.

In this FAX receiving processing, in S401, the CPU 11 of the receiver apparatus 2 initially judges whether the CPU 11 has received from the sender apparatus 1a requirement of establishing the connection with the sender apparatus 1. Where the CPU 11 has not received the requirement (S401: No), the present FAX receiving processing is finished. Where the CPU 11 has received the requirement (S401: Yes), the CPU 11 performs in S402 the connection establishing processing for establishing the connection with the sender apparatus 1. Where the connection cannot be established (S403: No), the present FAX receiving processing is finished.

Where the connection has been established (S403: Yes), the CPU 11 starts measurement of a timer for the CI signal and judges in S404 whether the CPU 11 has detected the CI signal or not. Where the CPU 11 has not detected the CI signal (S404: No), the CPU 11 judges in S405 whether a predetermined length of time (e.g., three minutes) has passed or not. Where the predetermined length of time has not passed (S405: No), the CPU 11 repeats the processing of S404. Where the predetermined length of time has passed (S405: Yes), the CPU 11 displays in S406 on the LCD 17 that the sender apparatus 1 may have misdialed, and the present FAX receiving processing is finished.

Where the CPU 11 has detected the CI signal (S404: Yes), the CPU 11 starts measurement of a timer and judges in S407 whether the receiver apparatus 2 has received from the sender apparatus 1 an IP packet indicating that the sender apparatus 1 has called the calling destination apparatus. Where the receiver apparatus 2 has not received the IP packet indicating that the sender apparatus 1 has called the calling destination apparatus (S407: No), the CPU 11 judges whether a predetermined length of time (e.g., thirty seconds) has passed or not. Where the predetermined length of time has not passed (S408: No), the CPU 11 repeats the processing of S407. Where the predetermined length of time has passed (S408: Yes), the CPU 11 judges in S409 whether the receiver apparatus 2 has received or not from the sender apparatus 1 the IP packet indicating that a calling destination apparatus to which the sender apparatus 1 transmits the FAX is in the busy state.

Where the receiver apparatus 2 has received from the sender apparatus 1 the IP packet indicating that the calling destination apparatus is in the busy state (S409: Yes), the CPU 11 displays in S410 on the LCD 17 that the receiver apparatus 2 has been called by an apparatus different from the sender apparatus 1. That is, this IP packet indicating that the calling destination apparatus is in the busy state indicates that the receiver apparatus 2 has been called by an apparatus different from the sender apparatus 1 after the receiver apparatus 2 has established the connection with the sender apparatus 1 and before the sender apparatus 1 has called the receiver apparatus 2. Where the receiver apparatus 2 has not received from the sender apparatus 1 the IP packet indicating that the calling destination apparatus is in the busy state (S409: No), the CPU 11 displays in 411 on the LCD 17 that some sort of network failure has been caused, and the present FAX receiving processing is finished.

Where the receiver apparatus 2 has received the IP packet indicating that the sender apparatus 1 has called the calling destination apparatus (S407: Yes), the CPU 11 transmits in S412 the ACK to the sender apparatus 1, and closes or connects the line in S413. Then, the CPU 11 or the receiver apparatus 2 receives in S414 data transmitted from the sender apparatus 1 and outputs in S415 the received data to the recording sheet, and the present FAX receiving processing is finished.

There will be explained effects of the communication apparatus as the first embodiment. As described above, the receiver apparatus 2 having received, via the IP network 200, the IP packet indicating that the sender apparatus 1 has called a calling destination apparatus transmits in S412 the ACK to the sender apparatus 1 via the IP network 200, and then the sender apparatus 1 receives the ACK (S317: Yes). Where the receiver apparatus 2 transmits the ACK in S412, the sender apparatus 1 can judge that there is a high possibility that the calling destination apparatus is the receiver apparatus 2, and thus the sender apparatus 1 can check whether the calling destination apparatus with which the sender apparatus 1 intends to communicate is correct or not. Then, the sender apparatus 1 controls the communication of the sender apparatus 1 with the calling destination apparatus via the PSTN 100 on the basis of the ACK received by the sender apparatus 1. Thus, there can be reduced a possibility that the sender apparatus 1 communicates with a wrong or unintended apparatus.

Further, in the first embodiment, the FAX number is used as the identification number on the PSTN 100, whereby the sender apparatus 1 can make a facsimile communication with a correct or intended apparatus. Further, the sender apparatus 1 includes the IP address memory 14b configured to store the IP address and the FAX number associated with the IP address, thereby making it possible for the sender apparatus 1 to speedily recognize the IP address and the FAX number.

Further, when the RBT signal has been detected (S310: Yes), the IP packet that the sender apparatus 1 has called the calling destination apparatus is transmitted to the receiver apparatus 2 via the IP network 200 in S316. Thus, there is a high possibility that the IP packet that the sender apparatus 1 has called the receiver apparatus 2 is transmitted when the calling destination apparatus is receiving the RBT signal, thereby making it possible for the sender apparatus 1 to precisely judge that the calling destination apparatus coincides with the receiver apparatus 2. Further, the ACK is transmitted in S412 to the sender apparatus 1 via the IP network 200 from the receiver apparatus 2 when the receiver apparatus 2 has received in S407 the IP packet that the sender apparatus 1 has called the calling destination apparatus while being called via the PSTN 100. Thus, the sender apparatus 1 can reliably realize by receiving the ACK that the receiver apparatus 2 is the calling destination apparatus, thereby reducing the possibility that the sender apparatus 1 communicates with the unintended apparatus.

Further, the sender apparatus 1 communicates with the calling destination apparatus via the PSTN 100 on condition that the sender apparatus 1 has received the ACK (S317: Yes), thereby reducing the possibility that the sender apparatus 1 communicates with the unintended apparatus. Further, the sender apparatus 1 stops the call in S322 where the ACK has not been received (S317: No) when the predetermined length of time has passed from the transmission of the IP packet (S321: Yes), thereby reducing the possibility that the sender apparatus 1 communicates with the unintended apparatus.

Further, the sender apparatus 1 transmits in S326 the IP packet that the calling destination apparatus is busy, to the receiver apparatus 2 via the IP network 200 when the busy signal has been detected (S311: Yes). Thus, the sender apparatus 1 can have the receiver apparatus 2 recognize that the sender apparatus 1 is communicating with an apparatus different from the receiver apparatus 2. Further, the sender apparatus 1 stops the calling where the stop of the RBT signal has not been detected (S320: No) and where the predetermined length of time has passed from the receiving of the ACK (S321: Yes). Even where the sender apparatus 1 has received the ACK, the receiver apparatus 2 may be called by an apparatus different from the sender apparatus 1. Thus, there can be further reduced the possibility that the sender apparatus 1 communicates with the unintended apparatus by stopping the calling where there is a possibility of the misdial.

Further, where the receiver apparatus 2 transmits the ACK (S412: Yes), the sender apparatus 1 can judge that there is a high possibility that an apparatus having detected the called signal is the receiver apparatus 2, whereby the sender apparatus 1 can check whether an apparatus with which the sender apparatus 1 is to communicate is correct or not. Then, the receiver apparatus 2 closes or connects the line in S413 after transmitting the ACK in S412. Thus, there can be reduced a possibility that the receiver apparatus 2 communicates with an unintended or wrong apparatus.

Further, the receiver apparatus 2 informs that the sender apparatus 1 is calling by using the FAX number different from the FAX number of the receiver apparatus 2, where the called signal has not been detected (S404: No) by the time when there has been judged that the predetermined length of time has passed from the establishment of the state in which the receiver apparatus 2 and the sender apparatus 1 are allowed to communicate with each other (S405: Yes). Thus, it becomes possible to have the user recognize that the sender apparatus 1 is calling by using the FAX number different from the FAX number of the receiver apparatus 2.

Further, in the case where the receiver apparatus 2 has received the notification that the BT signal has been detected (S409: Yes), where the receiver apparatus 2 has not received the notification that the sender apparatus 1 has called the calling destination apparatus (S407: No), the receiver apparatus 2 informs that the calling destination apparatus is being called by an apparatus different from the sender apparatus 1. Thus, it becomes possible to have the user recognize that the calling destination apparatus is being called by the apparatus different from the sender apparatus 1. Further, the receiver apparatus 2 informs in S411 that the network failure has occurred, where the receiver apparatus 2 has not received the notification that the BT signal has been detected (S409: No). Thus, it becomes possible to have the user recognize that the network failure has occurred.

There will be next explained a communication system S in a second embodiment with reference to FIGS. 5A, 5B, 5C, 6, and 7. This second embodiment is different from the first embodiment in that each of the sender apparatus 1 and the receiver apparatus 2 as the second embodiment which constitute the communication system S has a function for obtaining, before the telephone line is closed or connected, a FAX number of an apparatus calling the sender apparatus 1 or the receiver apparatus 2. It is noted that the other constructions are the same as those of each of the sender apparatus 1 and the receiver apparatus 2 as the first embodiment.

Figure 5A:
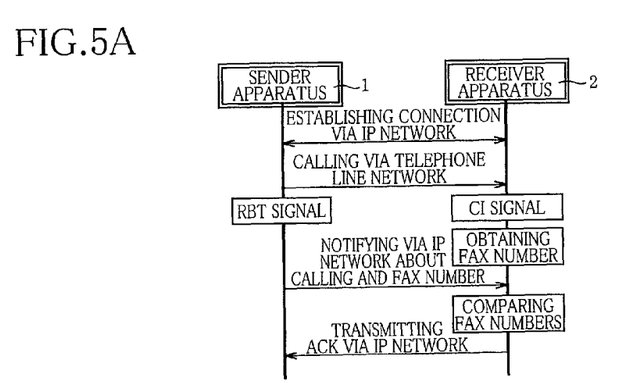
FIGS. 5A, 5B, and 5C are sequence views of a FAX transmitting processing in a second embodiment.
Figure 5B:
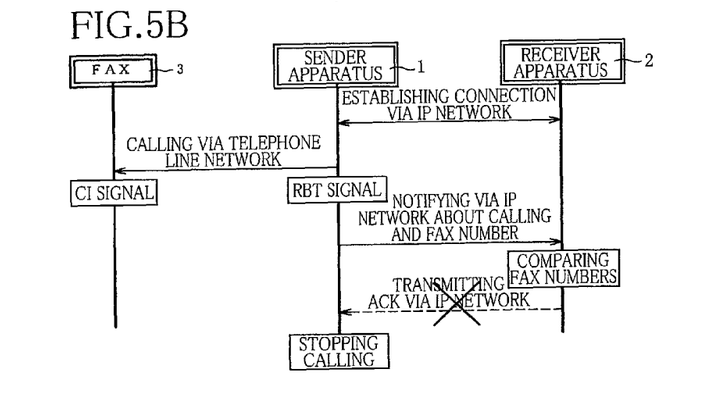
Figure 5C:
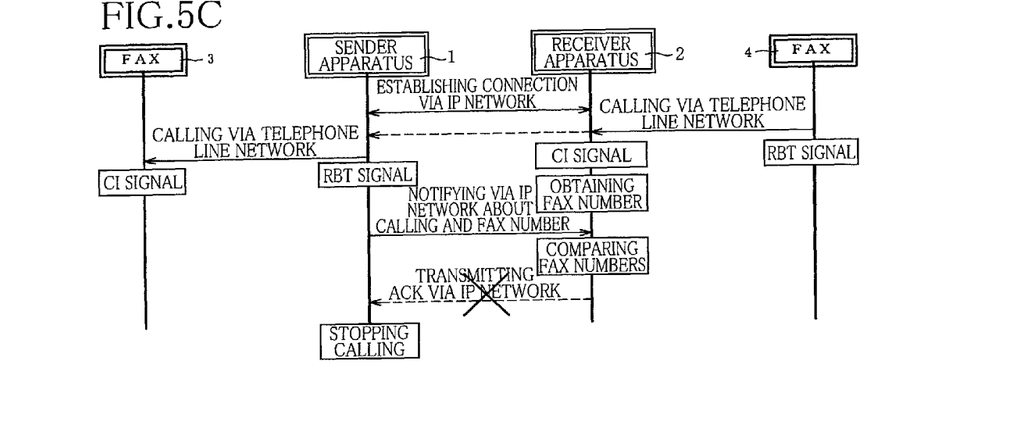

FIGS. 5A, 5B, and 5C respectively correspond to FIGS. 2A, 2B, and 2C. In the following explanation for the second embodiment, an explanation of the same structures and operations as explained for the first embodiment will be omitted.

FIG. 5A is a sequence view showing the case where the FAX number of the receiver apparatus 2 is properly dialed. Different part from the first embodiment is that the receiver apparatus 2 obtains a FAX number of the sender apparatus 1 where the sender apparatus 1 has called the receiver apparatus 2. Further, the sender apparatus 1 notifies, via the IP network 200, the receiver apparatus 2 of the FAX number in addition to an IP packet indicating that the sender apparatus 1 has called the receiver apparatus 2.

Then, the receiver apparatus 2 compares the FAX number obtained via the PSTN 100 with the FAX number obtained via the IP network 200, and transmits the ACK via the IP network 200 where the obtained FAX numbers coincide with each other.

FIG. 5B is a sequence view showing the case where the sender apparatus 1 has not properly dialed the FAX number of the receiver apparatus 2 and dialed not the receiver apparatus 2 but a FAX 3 which is a facsimile apparatus different from the receiver apparatus 2.

In this case, since the sender apparatus 1 has misdialed, the receiver apparatus 2 cannot obtain the FAX number of the sender apparatus 1 via the PSTN 100. Thus, even where the receiver apparatus 2 has received the FAX number of the sender apparatus 1 from the sender apparatus 1 via the IP network 200, the FAX numbers of the sender apparatus 1 via the PSTN 100 and the IP network 200 cannot be compared with each other because the receiver apparatus 2 has not obtain the FAX number of the sender apparatus 1 via the PSTN 100. Thus, the receiver apparatus 2 does not transmit the ACK to the sender apparatus 1. As a result, the sender apparatus 1 judges that the sender apparatus 1 has misdialed because the sender apparatus 1 has not received the ACK within a predetermined length of time, and the sender apparatus 1 forcefully stops calling.

FIG. 5C is a sequence view showing the case where the sender apparatus 1 has not properly dialed the FAX number of the receiver apparatus 2 and dialed not the receiver apparatus 2 but the FAX 3 as in the case of FIG. 2B. FIG. 5C especially shows the case where a FAX 4 has called the receiver apparatus 2 after the sender apparatus 1 has established the connection with the receiver apparatus 2 and before the sender apparatus 1 has called the FAX 3.

In this case, the receiver apparatus 2 obtains a FAX number of the FAX 4 via the PSTN 100. Further, the receiver apparatus 2 obtains the FAX number of the sender apparatus 1 from the sender apparatus 1 via the IP network 200. Then, the receiver apparatus 2 compares the FAX number of the FAX 4 obtained via the PSTN 100 with the FAX number of the sender apparatus 1 obtained via the IP network 200, but these FAX numbers do not coincide with each other, and thus the receiver apparatus 2 does not transmit the ACK to the sender apparatus 1. As a result, the sender apparatus 1 judges that the sender apparatus 1 has misdialed because the sender apparatus 1 has not received the ACK from the receiver apparatus 2 within a predetermined length of time, and the sender apparatus 1 forcefully stops calling.

Figure 6:
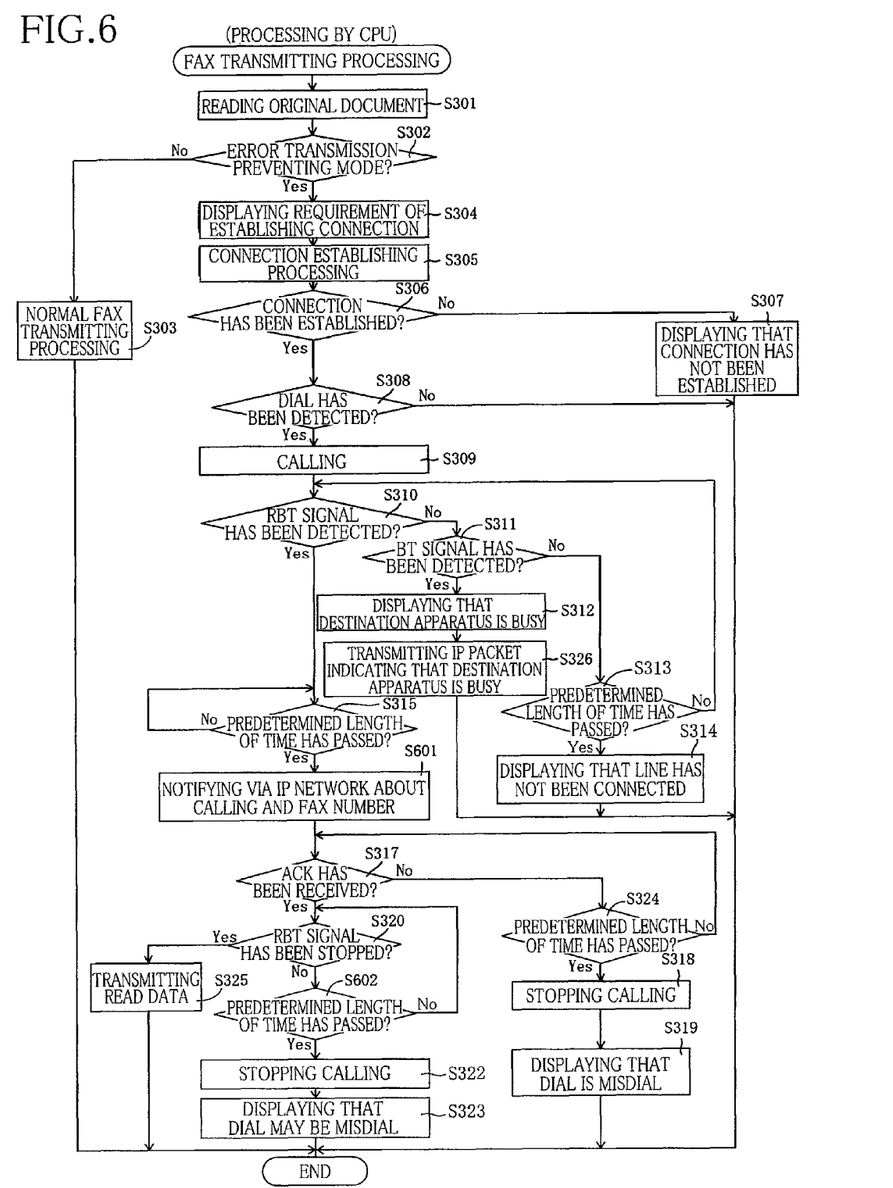
FIG. 6 is a flow-chart showing the FAX transmitting processing in the second embodiment.

There will be next explained a FAX transmitting processing in the second embodiment with reference to FIG. 6 which corresponds to FIG. 3. Here, only part of this second embodiment different from the first embodiment will be explained. It is noted that, in a flow-chart in FIG. 6, the same numerals as used in the first embodiment are respectively used for the same processings as in the flow-chart in FIG. 3. In this second embodiment, the sender apparatus 1 notifies, in S601 via the IP network 200, the receiver apparatus 2 of the FAX number of the sender apparatus 1 in addition to the IP packet indicating that the sender apparatus 1 has called the calling destination apparatus. It is noted that the IP packet transmitted in S601 may be an IP packet indicating that the sender apparatus 1 has called the receiver apparatus 2.

Further, in the first embodiment, even where the sender apparatus 1 has received the ACK from the receiving apparatus 2 (S317: Yes), there is a possibility of occurring of the misdial. However, in this second embodiment, where the sender apparatus 1 has received the ACK from the receiving apparatus 2 (S317: Yes), the misdial does not occur. Thus, the case in which the RBT signal has not stopped within the predetermined length of time (S320: No) is caused not because of the misdial but because the calling destination apparatus has not closed or connected the line.

Thus, in the second embodiment, a predetermined length of time for judging in S602 whether the RBT signal has been stopped or not is preferably set to be longer (e.g., 120 seconds) than that in the first embodiment (with reference to S321 in FIG. 3). Where the CPU 11 has judged that the predetermined length of time has not passed (S602: No) and where the RBT signal has been stopped (S320: Yes), the CPU 11 transmits in S325 read or scanned data to the calling destination apparatus by judging that the line has been closed or connected, and the present FAX transmitting processing is finished. On the other hand, where the CPU 11 has judged that the predetermined length of time has passed (S602: Yes) but the RBT signal has not been stopped (S320: No), the sender apparatus 1 stops calling.

As thus described, according to this second embodiment, where the sender apparatus 1 has received the ACK from the receiving apparatus 2, the sender apparatus 1 can be considered to have reliably called the calling destination apparatus (i.e., the receiving apparatus 2). Thus, it is possible to prevent the error transmission of the facsimile data further reliably.

Figure 7:
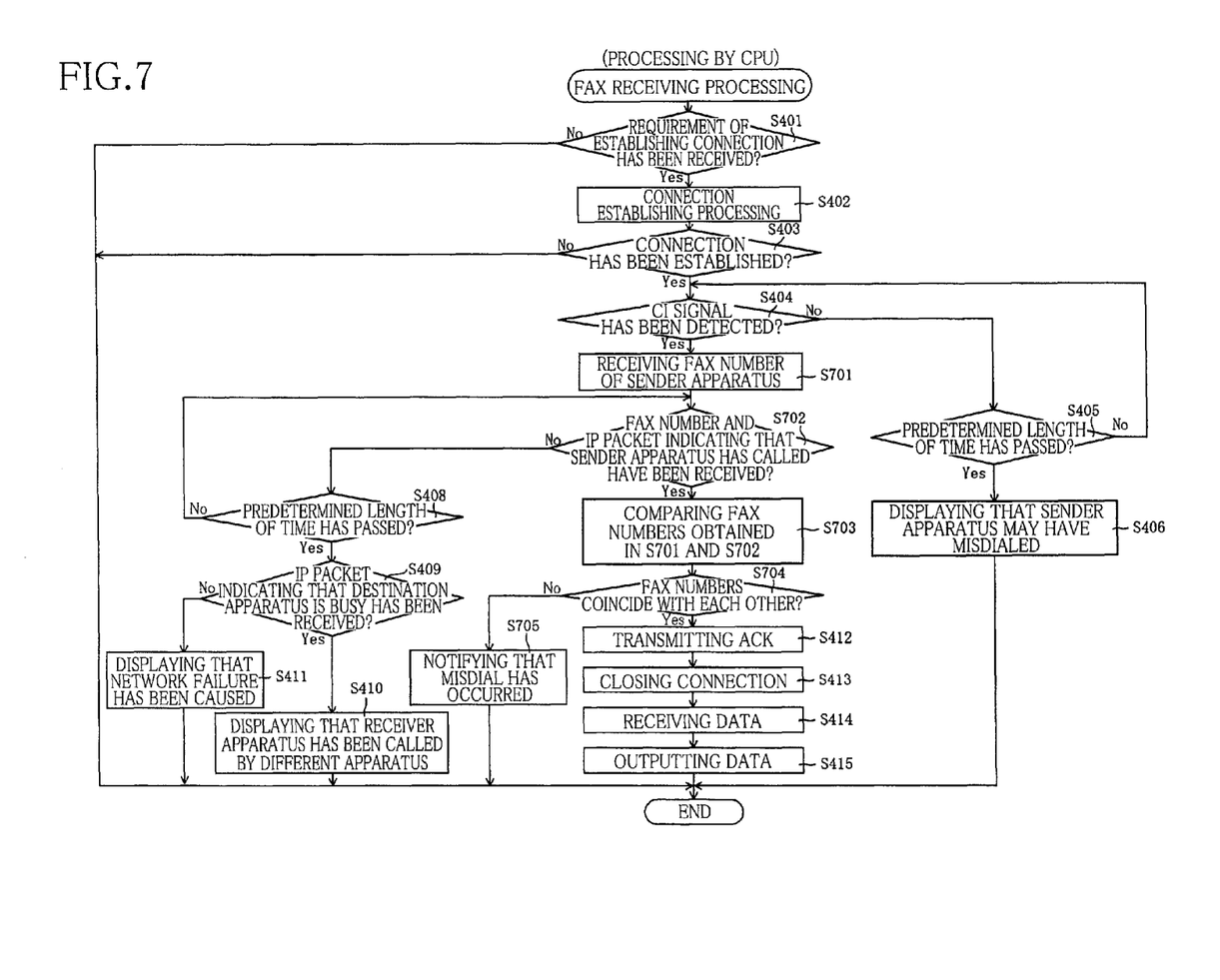
FIG. 7 is a flow-chart showing a FAX receiving processing in the second embodiment.

There will be next explained a FAX receiving processing in the second embodiment with reference to FIG. 7 which corresponds to FIG. 4. Here, only part of this second embodiment different from the first embodiment will be explained. It is noted that, in a flow-chart in FIG. 7, the same numerals as used in the first embodiment are respectively used for the same processings as in the flow-chart in FIG. 4. In this second embodiment, where the CPU 11 has detected the CI signal (S404: Yes), the receiver apparatus 2 receives in S701 the FAX number of the sender apparatus 1 via the PSTN 100. Then, the CPU 11 judges in S702 whether the receiver apparatus 2 has received the FAX number and the IP packet, via the IP network 200, indicating that the sender apparatus 1 has called the calling destination apparatus. Where the receiver apparatus 2 has not received the FAX number and the IP packet (S702: No), this FAX transmitting processing goes to S408 as in the first embodiment.

Where the receiver apparatus 2 has received the FAX number and the IP packet (S702: Yes), the CPU 11 compares in S704 the FAX number obtained in S701 with the FAX number obtained in S702. Where the obtained FAX numbers coincide with each other (S704: Yes), this FAX transmitting processing goes to S412 as in the first embodiment. On the other hand, where the obtained FAX numbers do not coincide with each other (S704: No), the receiver apparatus 2 notifies in S705 the sender apparatus 1 that the misdial has occurred.

While the embodiments of the present invention have been described above, it is to be understood that the invention is not limited to the details of the illustrated embodiments, but may be embodied with various changes and modifications, which may occur to those skilled in the art, without departing from the spirit and scope of the invention.

In the above-described embodiments, there has been explained the case where the sender apparatus 1 stops calling where the CPU 11 has judged that the sender apparatus 1 has misdialed. However, the present invention is not limited to this configuration. For example, the present communication apparatus may be configured such that the sender apparatus 1 notifies the user that the sender apparatus 1 has misdialed and forcefully stops calling only where the sender apparatus 1 has received the requirement of stopping of the calling from the user. Further, the present communication apparatus may be configured such that the sender apparatus 1 has the user manually stop the calling. Further, the present communication apparatus may be configured such that, where the CPU 11 has judged in S318 that the dial of the sender apparatus 1 is certainly misdial, the CPU 11 forcefully stops calling, and where the CPU 11 has judged in S322 that there is the possibility of the misdial, the CPU 11 has the user select to stop or continue the calling.

Further, in the above-described second embodiment, there has been explained the case where the CPU 11 judges whether an apparatus calling the receiver apparatus 2 is the sender apparatus 1 or an apparatus different from the sender apparatus 1, by comparing the FAX number obtained via the PSTN 100 with the FAX number obtained via the IP network 200. This judgment may be performed by preparing for the receiver apparatus 2 a table in which the FAX numbers and the IP addresses are respectively associated with each other, then specifying the FAX number of the sender apparatus 1 currently being connected to the receiver apparatus 2 on the basis of the IP address of the sender apparatus 1 currently being connected to the receiver apparatus 2, and finally comparing the specified FAX number with the FAX number obtained via the PSTN 100.

Further, in each of the above-described embodiments, the sender apparatus 1 in the communication system S is configured to prevent the FAX data from being transmitted to a wrong or unintended receiver apparatus by storing the IP address and the FAX number so as to correspond to each other and carrying out the communication using both of the IP address and the FAX number, but the present invention is not limited to this configuration. For example, the present communication apparatus may have the following configuration. That is, the sender apparatus 1 and the receiver apparatus 2 in the communication system S are respectively set to a calling apparatus and an identification-number assigned apparatus in a voice conversation, and the IP address and a telephone number are stored into an IP address memory of the calling apparatus in correspondence with each other, and the sender apparatus 1 judges whether a calling destination apparatus is a correct calling destination apparatus or not using both of the IP address and the telephone number, thereby making it possible to prevent calling a wrong number or an apparatus. That is, where information stored in the sender apparatus 1 is the IP address and an identification number on the PSTN (e.g., the telephone number and the FAX number) associated with the IP address, the communication is carried out using the IP address and the identification number on the PSTN via an internet and the PSTN, thereby making it possible to prevent communication with a wrong apparatus.

Further, in each of the above-described embodiments, the sender apparatus 1 of the communication system S stores the IP address and the FAX number into the IP address memory 14b, but the present invention is not limited to this configuration. For example, the sender apparatus 1 may be configured such that a plurality of FAX numbers are stored in an internal memory thereof, and where one of the FAX numbers has been specified by the user, the sender apparatus 1 inquires, via the internet, the IP address corresponding to the specified FAX number from a server connected to the internet, then obtains from the server an IP address stored in a memory of the server in correspondence with the specified FAX number, and then communicates with a receiver apparatus using the specified FAX number and the IP address obtained from the server. In this configuration, the FAX number and the IP address corresponding to the FAX number need to be stored in the memory in the server. Where the sender apparatus 1 is thus configured, the IP address does not need to be stored in the memory of the sender apparatus 1, thereby reducing an amount of a memory required for the sender apparatus 1. Further, instead of the above-described configuration, the sender apparatus 1 may be configured such that the IP address is stored in the internal memory of the sender apparatus 1 while the FAX number is stored in the memory of the server. Further, in the present invention, the sender apparatus 1 requires information of a pair of the FAX number and the IP address corresponding thereto, and the sender apparatus 1 may be configured to store information about a receiver (e.g., a company name and a name of the receiver) in the internal memory of the sender apparatus 1 while the server device stores the IP address and the FAX number in correspondence with the information about the receiver. In this configuration, the sender apparatus 1 does not need to store the IP address and the FAX number of the receiver apparatus, thereby reducing the amount of the memory required for the sender apparatus 1.

Further, in each of the above-described embodiments, the sender apparatus 1 of the communication system S dials the calling destination apparatus using the FAX number and, after detecting the output of the RBT signal transmitted from the switch, notifies the receiver apparatus 2 via the internet that the sender apparatus 1 has called the calling destination apparatus, but the present invention is not limited to this configuration. For example, the sender apparatus 1 may be configured to make the dial using the FAX number and, after a predetermined length of time has passed from the dial (that is, from the time when a dial operation is finished) notifies, via the internet, the receiver apparatus 2 that the sender apparatus 1 has called the calling destination apparatus. Where the predetermined length of time is set on the basis of a length of time from the dial of the sender apparatus 1 to the time when the calling destination apparatus has been called by the switch (that is, the CI signal has been outputted from the switch to the calling destination apparatus, it becomes possible that the sender apparatus 1 transmits, without detection of the RBT signal, the notification that the sender apparatus 1 has called the calling destination apparatus, thereby simplifying the control performed by the sender apparatus 1.

Further, in each of the above-described embodiments, the receiver apparatus 2 transmits the ACK to the sender apparatus 1 where the receiver apparatus 2 has received from the sender apparatus 1 the notification that the sender apparatus 1 has called the calling destination apparatus during the receiving of the CI signal outputted by the switch, but the present invention is not limited to this configuration. For example, in the case where the receiver apparatus 2 has received from the sender apparatus 1 the notification that the sender apparatus 1 has called the calling destination apparatus where the receiver apparatus 2 has not received the CI signal, the receiver apparatus 2 may transmit to the sender apparatus 1 a notification that the receiver apparatus 2 has received the notification of the calling of the sender apparatus 1 although the receiver apparatus 2 has not received the CI signal. The sender apparatus 1 having received this notification can recognize that the receiver apparatus 2 has not been called by the dial of the sender apparatus 1, thereby judging that the FAX number used in the dial is a wrong number. Thus, the sender apparatus 1 can be prevented, by stopping the call, from transmitting the facsimile data to an apparatus different from the receiver apparatus 2 to receive the FAX.

In view of the above, the CPU 11 of the communication apparatus can be considered to include a requiring section configured to transmit, from the sender apparatus 1 to the receiver apparatus 2, a requirement for establishing a state in which the receiver apparatus 2 is allowed to communicate with the sender apparatus 1 via the IP network 200, wherein the requirement is transmitted from the sender apparatus 1 to the receiver apparatus 2 via the IP network 200 by using the IP address of the receiver apparatus 2, and this requiring section can be considered to perform the processing of S304. Further, the CPU 11 can be considered to include a first communication establishing section configured to establish a state in which the sender apparatus 1 is allowed to communicate via the IP network 200 with the receiver apparatus 2 that has accepted the transmitted request, and this first communication establishing section can be considered to perform the processing of S305.

Further, the CPU 11 can be considered to include a calling section configured to transmit the dial signal of the FAX number associated with the IP address of the receiver apparatus 2, to the switch via the PSTN 100 and to call the calling destination apparatus, when the first communication establishing section has established the state in which the sender apparatus 1 is allowed to communicate with the receiver apparatus 2, and this calling section can be considered to perform the processing of S309. Further, the CPU 11 can be considered to include a notifying section configured to transmit a notification that the sender apparatus 1 has called the calling destination apparatus, from the sender apparatus 1 to the receiver apparatus 2 via the IP network 200 after the calling section has called, and this notifying section can be considered to perform the processing of S316. Further, the CPU 11 can be considered to include a first receiving section configured to receive the ACK, and this first receiving section can be considered to perform the processing of S317. Further, the CPU 11 can be considered to include a communication controlling section configured to control the communication of the sender apparatus 1 with the calling destination apparatus via the PSTN 100, on the basis of the ACK received by the first receiving section, and this communication controlling section can be considered to perform the processings of S325, S322, and S318.

Further, the CPU 11 can be considered to include a ringing signal detecting section configured to detect the RBT signal, and this ringing signal detecting section can be considered to perform the processing of S310. Further, the CPU 11 can be considered to include a communication performing section configured to communicate with the calling destination apparatus via the PSTN 100 on condition that the first receiving section has received the ACK, and this communication performing section can be considered to perform the processing of S325. Further, the CPU 11 can be considered to include a first stopping section configured to stop the call of the calling section where the first receiving section has not received the ACK by the time when a predetermined length of time has passed from the transmission of the notification by the notifying section, and this first stopping section can be considered to perform the processing of S318.

Further, the CPU 11 can be considered to include a busy signal detecting section configured to detect the BT signal, and this busy signal detecting section can be considered to perform the processing of S311. Further, the CPU 11 can be considered to include a first judging section configured to judge whether a predetermined length of time has passed or not from the receiving of the ACK by the first receiving section, and this first judging section can be considered to perform the processing of S321. Further, the CPU 11 can be considered to include a ringing-signal-stop detecting section configured to detect whether the RBT signal is stopped or not, and this ringing-signal-stop detecting section can be considered to perform the processing of S320. Further, the CPU 11 can be considered to include a second stopping section configured to stop the calling of the calling section where the ringing-signal-stop detecting section has not detected the stop of the RBT signal and where the first judging section has judged that the predetermined length of time has passed from the receiving of the ACK by the first receiving section, and this second stopping section can be considered to perform the processing of S322.

Further, in view of the above, the CPU 11 of the communication apparatus can be considered to include a second communication establishing section configured to establish a state in which the receiver apparatus 2 and the sender apparatus 1 are allowed to communicate with each other via the IP network 200 where the requirement for establishing the state in which the receiver apparatus 2 and the sender apparatus 1 are allowed to communicate with each other via the IP network 200 has been transmitted, and this second communication establishing section can be considered to perform the processing of S402. Further, the CPU 11 can be considered to include a called signal detecting section configured to detect the CI signal where the second communication establishing section has established the state in which the receiver apparatus 2 and the sender apparatus 1 are allowed to communicate with each other, and this called signal detecting section can be considered to perform the processing of S404.

Further, the CPU 11 can be considered to include a second receiving section configured to receive a notification, via the IP network 200, that the sender apparatus 1 has called the calling destination apparatus, during the detection of the CI signal by the called signal detecting section, and this second receiving section can be considered to perform the processing of S407. Further, the CPU 11 can be considered to include an acknowledgment signal transmitting section configured to transmit the ACK to the sender apparatus 1 via the IP network 200 where the receiver apparatus 2 has received the notification that the sender apparatus 1 has called the calling destination apparatus, and this acknowledgment signal transmitting section can be considered to perform the processing of S412. Further, the CPU 11 can be considered to include a connecting section configured to connect the PSTN 100 when the ACK transmitting section has transmitted the ACK, and this connecting section can be considered to perform the processing of S413.

Further, the CPU 11 can be considered to include a second judging section configured to judge whether a predetermined length of time has passed or not from the time when the second communication establishing section has established the state in which the receiver apparatus 2 and the sender apparatus 1 are allowed to communicate with each other, and this second judging section can be considered to perform the processing of S405. Further, the CPU 11 can be considered to include a first informing section configured to inform that the sender apparatus 1 is calling by using the FAX number different from the FAX number of the receiver apparatus 2 where the called signal detecting section has not detected the CI signal by the time when the second judging section has judged that the predetermined length of time has passed from the establishment of the state in which the receiver apparatus 2 and the sender apparatus 1 are allowed to communicate with each other, and this first informing section can be considered to perform the processing of S406.

Further, the CPU 11 can be considered to include a third receiving section configured to receive a notification that the BT signal has been detected, from the sender apparatus 1 via the IP network 200, where the second receiving section has not received the notification that the sender apparatus 1 has called the calling destination apparatus, and this third receiving section can be considered to perform the processing of S409. Further, the CPU 11 can be considered to include a second informing section configured to inform that the receiver apparatus 2 is being called by an apparatus different from the sender apparatus 1 where the third receiving section has received the notification that the BT signal has been detected, and this second informing section can be considered to perform the processing of S410. Further, the CPU 11 can be considered to include a third informing section configured to inform that the network failure has occurred, where the second receiving section has not received the notification that the BT signal has been detected, and this third informing section can be considered to perform the processing of S411.

Further, the CPU 11 can be considered to include an obtaining section configured to obtain a FAX number of a calling apparatus having caused the switch to transmit the CI signal to be detected by the called signal detecting section, and this obtaining section can be considered to perform the processing of S701. Further, the CPU 11 can be considered to include a checking section configured to check whether the FAX number which has been obtained by the obtaining section and the FAX number which has been received by the second receiving section coincide with each other or not, and this checking section can be considered to perform the processing of S704.

What is claimed is:

1. A communication apparatus configured to communicate with a first communication apparatus different from the communication apparatus via both of a public switched telephone network (PSTN) and an internet, the communication apparatus comprising:

a requiring section configured to transmit, from the communication apparatus to the first communication apparatus, a requirement for establishing a state in which the first communication apparatus is allowed to communicate with the communication apparatus via the internet, the requirement being transmitted from the communication apparatus to the first communication apparatus via the internet by using an IP address of the first communication apparatus;

a first communication establishing section configured to establish a state in which the communication apparatus is allowed to communicate via the internet with the first communication apparatus that has accepted the requirement transmitted by the requiring section;

a calling section configured to transmit a dial signal of a first identification number to a switch via the PSTN to call a first-identification-number assigned apparatus when the first communication establishing section has established the state in which the communication apparatus is allowed to communicate with the first communication apparatus, wherein the first identification number is an identification number of the a first-identification-number assigned apparatus used on the PSTN and the first identification number is associated with the IP address of the first communication apparatus and the switch is placed on the PSTN;

a notifying section configured to transmit a notification about calling of the communication apparatus, from the communication apparatus to the first communication apparatus via the internet after the calling section has called;

a first receiving section configured to receive a called-acknowledgement-signal from the first communication apparatus, wherein the called-acknowledgement-signal is transmitted from the first communication apparatus to the communication apparatus via the internet when the first communication apparatus has received the notification and the first communication apparatus has been called via the PSTN; and a communication controlling section configured to control communication of the communication apparatus with the first communication apparatus via the PSTN when the first receiving section has received the called-acknowledgement-signal transmitted from the first communication apparatus.

2. The communication apparatus according to claim 1, wherein the first identification number on the PSTN is a facsimile number.

3. The communication apparatus according to claim 1, further comprising a storage portion configured to store the IP address and the first identification number on the PSTN, the first identification number being associated with the IP address.

4. The communication apparatus according to claim 1, further comprising a ringing signal detecting section configured to detect a transmission of a ringing signal indicating that the switch is calling the first-identification-number assigned apparatus by calling the first-identification-number assigned apparatus by the calling section,
wherein the notifying section is configured to transmit the notification about the calling of the communication apparatus, from the communication apparatus to the first communication apparatus via the internet when the ringing signal detecting section has detected the ringing signal.

5. The communication apparatus according to claim 1, wherein the called-acknowledgement-signal is transmitted to the communication apparatus via the internet from the first communication apparatus having received the notification from the notifying section, when the first communication apparatus has received the notification from the notifying section while being called via the PSTN.

6. The communication apparatus according to claim 1, wherein the called-acknowledgement-signal is a signal indicating that the first communication apparatus having received the notification transmitted by the notifying section has been called via the PSTN, and
wherein the communication controlling section includes a communication performing section configured to perform communication of the communication apparatus with the first-identification-number assigned apparatus via the PSTN on condition that the first receiving section has received the called-acknowledgement-signal.

7. The communication apparatus according to claim 1, wherein the communication controlling section includes a first stopping section configured to stop a calling of the calling section where the first receiving section has not received the called-acknowledgement-signal by the time when a predetermined length of time has passed from the transmission of the notification by the notifying section.

8. The communication apparatus according to claim 1, further comprising a busy signal detecting section configured to detect a busy signal indicating that the switch is communicating with the first-identification-number assigned apparatus called by another communication apparatus,
wherein the notifying section is configured to further transmit a busy-notification that the identification number first-identification-number assigned apparatus is busy, to the first communication apparatus via the internet when the busy signal detecting section has detected the busy signal.

9. The communication apparatus according to claim 4, further comprising:
a first judging section configured to judge whether a predetermined length of time has passed or not from the time when the first receiving section has received the called-acknowledgment signal; and
a ringing-signal-stop detecting section configured to detect whether the transmission of the ringing signal is stopped or not,
wherein the communication controlling section includes a second stopping section configured to stop a calling of the calling section where the ringing-signal-stop detecting section has not detected a stop of the transmission of the ringing signal and where the first judging section has judged that the predetermined length of time has passed from the receiving of the called-acknowledgment signal by the first receiving section.

10. The communication apparatus according to claim 1, wherein the notifying section is configured to further notify the first communication apparatus of a second identification number, which is an identification number of the communication apparatus on the PSTN, and
wherein the first receiving section is configured to receive the called-acknowledgement-signal, which is transmitted when the first communication apparatus notified by the notifying section has been judged that the second identification number on the PSTN notified by the notifying section and the identification number of an apparatus on the PSTN that is calling the first communication apparatus via the PSTN coincide with each other.

11. The communication apparatus according to claim 1, further comprising:
a second communication establishing section configured to establish a state in which the communication apparatus is allowed to communicate with a second communication apparatus different from the communication apparatus via the internet where a requirement for establishing the state in which the communication apparatus is allowed to communicate with the second communication apparatus via the internet has been transmitted;
a called signal detecting section configured to detect a called signal which is transmitted from the switch placed on the PSTN, where the second communication establishing section has established the state in which the communication apparatus is allowed to communicate with the second communication apparatus;

a second receiving section configured to receive, via the internet, notification about calling of the second communication apparatus;

an acknowledgment signal transmitting section configured to transmit a called-acknowledgement-signal indicating that the second receiving section has received the notification about a calling of the second communication apparatus, to the second communication apparatus via the internet where the second receiving section has received the notification about the calling of the second communication apparatus during the detection of the called signal by the called signal detecting section; and a connecting section configured to connect the PSTN when the acknowledgment signal transmitting section has transmitted the called-acknowledgement-signal.

12. The communication apparatus according to claim 11, further comprising:

a second judging section configured to judge whether a predetermined length of time has passed from the time when the second communication establishing section has established the state in which the communication apparatus is allowed to communicate with the second communication apparatus; and a first informing section configured to inform that the second communication apparatus is calling by using another identification number different from an identification number of the communication apparatus on the PSTN where the called signal detecting section has not detected the called signal by the time when the second judging section has judged that the predetermined length of time has passed from the establishment of the state in which the communication apparatus is allowed to communicate with the second communication apparatus.

13. The communication apparatus according to claim 11, further comprising:

a third receiving section configured to receive a busy-signal-notification that a busy signal indicating that the switch is communicating with the communication apparatus called by another communication apparatus has been detected, from the second communication apparatus via the internet, where the second receiving section has not received the notification about the calling of the second communication apparatus; and a second informing section configured to inform that the communication apparatus is being called by said another communication apparatus different from the second communication apparatus where the third receiving section has received the busy-signal-notification that the busy signal has been detected.

14. The communication apparatus according to claim 13, further comprising a third informing section configured to inform that a network failure has occurred, where the third receiving section has not received the busy-signal-notification that the busy signal has been detected.

15. The communication apparatus according to claim 11, further comprising an obtaining section configured to obtain a third identification number, which is an identification number of a calling apparatus on the PSTN, the calling apparatus having caused the switch to transmit the called signal to be detected by the called signal detecting section, wherein the second receiving section is configured to further receive a fourth identification number, which is an identification number of the second communication apparatus on the PSTN via the internet, wherein the communication apparatus further comprises a checking section configured to check whether the third identification number on the PSTN which has been obtained by the obtaining section and the fourth identification number on the PSTN which has been received by the second receiving section coincide with each other or not, and wherein the acknowledgment signal transmitting section is configured to transmit the called-acknowledgment signal to the second communication apparatus where the third identification number on the PSTN which has been obtained by the obtaining section and the fourth identification number on the PSTN which has been received by the second receiving section coincide with each other as a result of the check of the checking section.

* * * * *